United States Patent [19]

Woolfson

[11] 4,314,276
[45] Feb. 2, 1982

[54] AUTOBORESIGHTING ELECTRO-OPTICAL SYSTEM

[75] Inventor: Martin G. Woolfson, Baltimore, Md.

[73] Assignee: Westinghouse Electric Corp., Pittsburgh, Pa.

[21] Appl. No.: 118,817

[22] Filed: Feb. 5, 1980

[51] Int. Cl.³ .............................................. H04N 7/18
[52] U.S. Cl. .............................. 358/125; 250/203 CT; 356/152; 356/153
[58] Field of Search ................ 358/125, 126; 356/153, 356/152, 3; 250/203 CT, 203 R; 455/604

[56] References Cited

U.S. PATENT DOCUMENTS

| | | | |
|---|---|---|---|
| 3,769,456 | 10/1973 | Woolfson et al. | 358/126 |
| 4,155,096 | 5/1979 | Thomas et al. | 358/125 |
| 4,227,212 | 10/1980 | Woolfson et al. | 358/126 |

Primary Examiner—Robert L. Richardson
Assistant Examiner—Edward L. Coles
Attorney, Agent, or Firm—W. E. Zitelli

[57] ABSTRACT

In an electro-optical (E-O) system, the reference axis of a beam of light emitted from a light source is aligned colinear with the boresight image axis and the combined images with their colinear axes spatially fixed are guided to the field of view of an electro-optical sensor which is operative to generate sequentially frames of electrical information in a raster scan format representative of the field of view. The light source of the system is controlled to effect a predetermined time pattern of light beam image intensity variations as sensed by the electro-optical sensor. A position of the sensed light beam image in the generated frame of electrical information is detected in accordance with the predetermined time pattern intensity variation thereof. A positional relationship of the detected image position with respect to the predetermined frame reference position is established for the generated frame information of the electro-optical sensor. The raster scanned field of view is adjusted in the generated frames of electrical information as a function of the established positional relationship to converge the detected position of the sensed light beam image to the predetermined frame reference position, preferably centered within the generated frames of electrical information. Since the light beam axis and boresight axis are spatially fixed colinear by the optical elements of the system, the boresight axis is rendered substantially at the predetermined frame reference position in the generated frames of electrical information.

10 Claims, 9 Drawing Figures

AUTOBORESIGHTING ELECTRO-OPTICAL SYSTEM

GOVERNMENT CONTRACT CLAUSE

The invention herein described will be first reduced to practice in the course of or under a contract or subcontract thereunder with the Department of the Army.

BACKGROUND OF THE INVENTION

The present invention relates broadly to electro-optical systems, in general, and more particularly, to an improvement which references the boresight axis of the electro-optical system with a predetermined frame reference position in the frames of electrical information generated by an electro-optical sensor included in the system.

In an electro-optical tracking system, very accurate position information related to a boresighted target is normally required for system operational effectiveness. The measuring system is generally based on a raster scanning electro-optical sensor where all position measurements are assumed relative to an actual boresight axis of the system. However, the measurement space is usually set up in a purely arbitrary manner, that is, the actual boresight axis may be in an arbitrary position in the raster scan of the electro-optical sensor. In order to obtain accurate position measurements, a way should be provided to center the true optical axis or boresight axis of the system in the raster scan of the electro-optical sensor.

Generally, for a given set of static conditions, the raster scan center of the electro-optical sensor may be aligned with the boresight axis of the system by setting bias values in the sensor's raster scan mechanism to introduce offsets which adjust the image of the actual boresight axis. Since most electro-optical tracking systems include complex combinations of optical elements, it is generally understood that many of the optical elements may incur movement. In fact, there are some tracking systems which utilize rotatable optical elements. Of course, any substantial movement of one or more of the optical elements from the static conditions used to set the bias values in the raster scan mechanism is likely to cause misalignment between the actual boresight axis and the raster scan center (apparent boresight axis). To make matters worse, optical elements are additionally vulnerable to thermal variations which may further compound any apparent misalignment problems causing the tracking reference measurements to be even more inaccurate.

Since the boresighting requirements of an electro-optical tracking system are normally extreme, it may be necessary, in some cases, to compensate for the relatively slow dynamic variations between the actual and apparent boresight axes. For example, in one known system, it is necessary to measure the actual boresight axis variations and introduce signals representative thereof in the apparent tracking position measurements for compensating purposes. However, because of the non-linearities created by the raster scan of the electro-optical sensor, there is no direct proportionality for the position difference in the raster scan between the actual and apparent boresight axes, i.e., the distance from the center of the raster scan where the axis image is actually projected. Consequently, any compensation attempt in this regard generally may still result in an inaccurate tracking position measurement.

Apparently, there is only one stable reference point in the raster scan of the electro-optical sensor for deriving position measurements and that is the raster scan center. Accordingly, a boresighting system which maintains the actual boresight axis at the center of the sensor's raster scan through the aforementioned slow moving dynamic variations of one or more of the optical elements thereof appears most desirable for achieving the required accuracy in deriving tracking measurements. A description of such a system is included in the specification heretofollow.

SUMMARY OF THE INVENTION

An electro-optical system includes a combination of optical elements aligned for rendering the boresight image axis of the system colinear with a reference axis of a light beam emitted from a light source. The combination of optical elements additionally guides the combined images with their colinear axes spatially fixed to the field of view of an electro-optical sensor. The sensor is operative to generate sequentially frames of electrical information in a raster scan format representative of its field of view. In accordance with the present invention, means are provided to reference the boresight image axis to a predetermined frame reference position in the generated frames of electrical information.

More specifically, the light source of the system is controlled to effect a predetermined time pattern of light beam image intensity variations as sensed by the electro-optical sensor. A position of the sensed light beam image in the generated frame of electrical information is detected in accordance with the predetermined time pattern intensity variation thereof. A positional relationship of the detected image position with respect to the predetermined frame reference position is established for the generated frame information of the electro-optical sensor. Means are provided to adjust the raster scanned field of view in the generated frames of electrical information as a function of the established positional relationship to converge the detected position of the sensed light beam image to the predetermined frame reference position, preferably centered within the generated frames of electrical information. Since the light beam axis and boresight axis are spatially fixed colinear by the optical elements of the system, the boresight axis is rendered substantially at the predetermined frame reference position in the generated frames of electrical information.

DESCRIPTION OF THE PREFERRED EMBODIMENT

Figure 1:
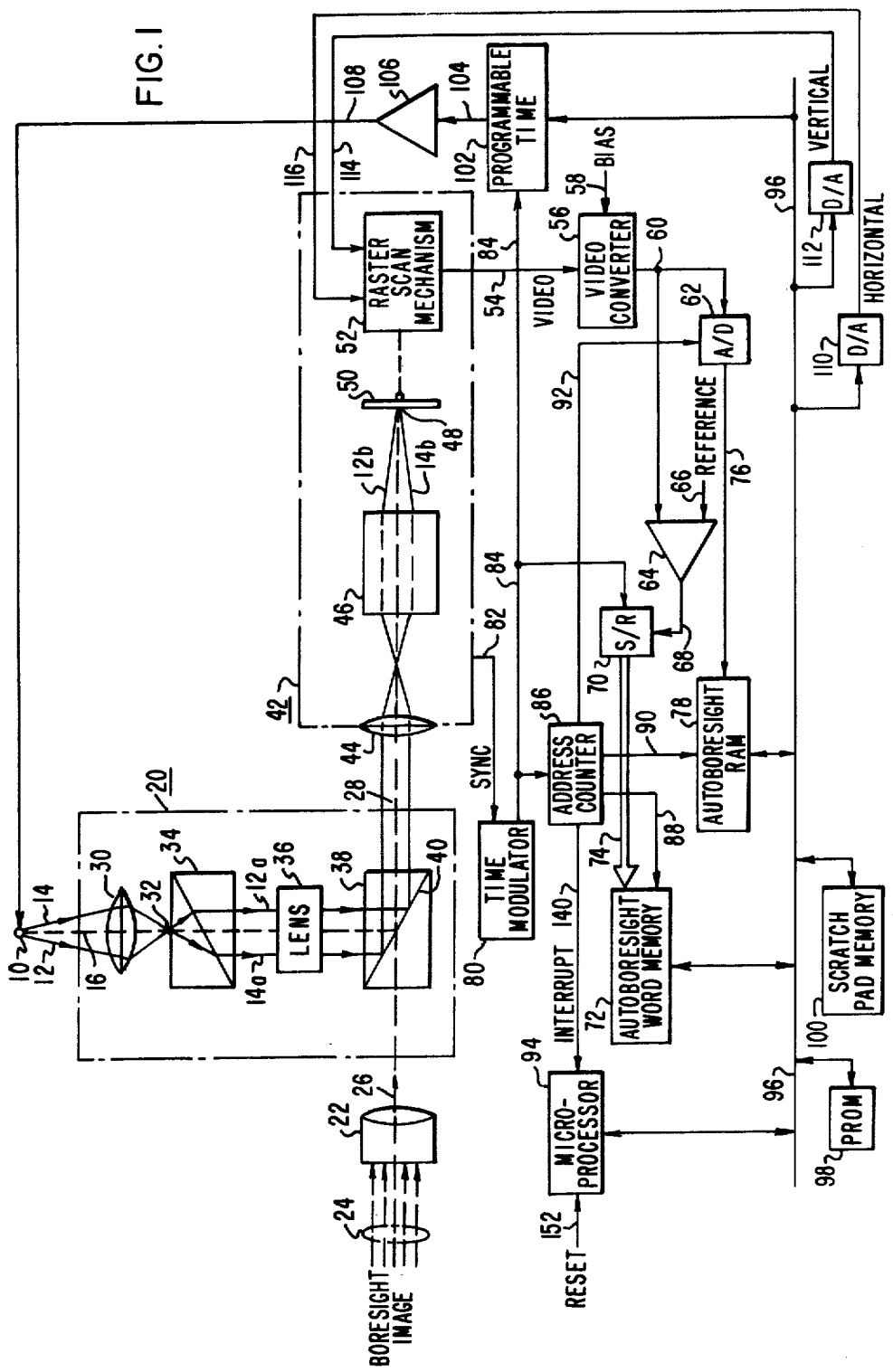
FIG. 1 is a block diagram schematic of an electro-optical system suitable for embodying the principles of the present invention.

An electro-optical system which may be used to embody the principles of the present invention is illustrated in a block diagram schematic as shown in FIG. 1. A conventional light source 10 is disposed in the electrical optical system and aligned in such a manner to pass a beam of light having rays 12 and 14 and a reference axis 16 through a combination of optical elements 20. In addition, a conventional lens combination 22, disposed in the electrical optical system, is utilized to direct a boresighted image denoted by the lines or rays 24 to the combination of optical elements 20. The boresighted image 24 comprises a boresight axis denoted at 26.

The light source 10, lens combination 22 and optical element combination 20 may all be spatially and fixedly aligned to combine the images of the boresight and light beam and to render their axes 26 and 16, respectively, colinear as denoted by dashed line 28.

More specifically, as one example of the combination of optical elements 20, a converging lens 30 may be used to refract the light beam rays 12 and 14 effecting a focal length at a point 32 located substantially at the surface of a first beam splitter 34. The refracted light beam rays 12 and 14 may be substantially collimated by the first beam splitter 34 and provided to another series of lens combination 36. The collimated light beam image denoted by the rays 12a and 14a and reference axis 16, are then spatially provided to a second beam splitter 38 which includes a dichroic mirror 40 therein. The boresighted image 24 located about its boresight axis 26 is also provided to the second beam splitter 38 wherein a portion thereof may be refracted through the dichroic mirror 40 located therein. The dichroic mirror 40 is aligned with the light beam image such that a reflection thereof effectuates a combination of reflected and refracted images having substantially colinear axes as shown at 28. It is understood that the above description of the optical combination of elements 20 is merely provided to illustrate one embodiment for rendering the reference axis 16 colinear with the boresight axis 26. Accordingly, it is not applicant's intention to have his inventive principles limited to any one such embodiment, but rather include all such conventional embodiments which may achieve the same functional result.

The optical combination 20 additionally directs the combined images with their substantially colinear axes 28 to the field of view of an electro-optical sensor denoted by the dash block of 42. Generally, the combined images are passed through the camera lens at 44 and thereafter through another set of lens 46, commonly referred to as relay lens, which may be used to converge the rays of the light beam image represented by lines 12b and 14b to a spot 48 on a sensor faceplate 50 in relation to the colinear axis 28. For the case in which a television camera is used as the sensor 42 the sensor faceplate 50 is a photocathode plate which conventionally may be scanned by a well-known raster scan mechanism shown at 52 to convert the light signal images stored thereon into electrical signals. In the present embodiment, a video signal 54 may be generated from the raster scan mechanism 52 at a particular frame or field rate, like 30 Hz, for example. The electrical information of each frame or field may be organized in a conventional raster scan format and is representative of the field of view of the electro-optical sensor 42.

In accordance with the present invention, the field-of-view video signal 54 may be provided to one input of a video converter circuit 56 and a bias signal 58 may be provided to another input thereof. The converted video output signal 60 may be coupled to both a conventional A/D converter 62 and a comparator circuit 64 for digitizing purposes. Another input to the comparator 64 may be a reference signal 66. The digitized output signal 68 of the comparator 64 may be provided to a serial input of a shift register (S/R) 70. The contents of the shift register 70 may be coupled to an autoboresight word memory 72 in a parallel format over signal lines 74. The digitized output signal 76, converted from unit 62, may be provided to an autoboresight random access memory (RAM) 78 also in a parallel format.

Furthermore, a conventional time modulator circuit 80 may be synchronously operative with the electro-optical sensor 42 utilizing a sync signal 82 which is conventionally generated from the sensor 42, to control the clocking rates and addressing sequences of the aforementioned electronic units. More specifically, time signals 84 generated by the time modulator 80 in a conventional manner may be used to partition at least a predetermined portion of the raster scan electrical frame information into an array of picture elements or pixels. In particular, this timing signal 84 may be coupled to the clocking input of the shift register 70 to perform such partitioning, the description of which will be provided in greater detail hereinbelow. The timing signal 84 may be additionally coupled to an address counter 86 which responsively generates address output signals 88 and 90 which are coupled to the address inputs of the memory units 72 and 78, respectively. Another address related signal 92 generated by the counter 86 may be provided to govern the conversion operations of the A/D 62.

Moreover, electronic central processing unit 94, which may be a microprocessor of the type having a Model No. 8085 manufactured by INTEL Corporation, for example, may be coupled to a compatible microprocessor bus 96 which is primarily used to transfer data, address, and control signals between the microprocessor 94 and other memory and input/output devices which may be coupled to the bus 96. A plurality of sets of instructions in the form of binary digital words may be preprogrammed in a programmable read-only memory (PROM) 98 which is operationally coupled to the microprocessor bus 96. It is understood that the digital instruction words stored PROM 98 are in the machine language form decipherable by the microprocessor 94 for controlling the sequential operations conducted thereby. Generally, a scratchpad memory 100 is additionally coupled to the microprocessor bus 96 for temporarily storing operational and computational digital words generated during the processing operations of the microprocessor 94.

To interact with the electro-optical elements, both of the memories 72 and 78 are coupled to the microprocessor bus 96 in a conventional manner such that the contents stored therein may become accessible to the microprocessor 94 for use during its processing operations and a programmable timer 102, which may be compatible with the operations of the microprocessor 94, may also be coupled to the microprocessor bus 96 for outputting a pulse width modulated signal 104. As will be described in greater detail hereinbelow, the pulse width of the signal 104 may be normally determined from the derivations of the processing operations of the microprocessor 94 and the generation time of the signal 104 is normally associated with the vertical blanking of the conventional raster scan frame information as determined from the signal line 84 which may be additionally provided to the programmable timer 102 for synchronizing purposes. The signal 104 may be input to a current driver 106, for example, the output current signal 108 of which may provide the current to the light source 10 at the predetermined time and for the predetermined duration as determined by the programmable timer 102. For the purposes of the present embodiment, the light source 10 may be a light emitting diode, the intensity of which being time varied by the current signal 108.

Additionally disposed in the electronics for interacting with the electro-optical sensor 42 may be two conventional digital-to-analog converters 110 and 112, both of which being compatibly operated with the microprocessor 94 utilizing the microprocessor bus 96 to provide vertical and horizontal analog control signals 114 and 116, respectively, to the raster scan mechanism 52. The values of the analog signals over lines 114 and 116 may be used in the raster scan mechanism 52 to adjust the raster scan field of view in the generated frames of electrical information output over the video signal 54.

In more particular detail, light source 10 is primarily controlled to effect a predetermined time pattern of light beam image intensity variation as sensed by the electro-optical sensor 42 on its photocathode plate 50, for example. In operation, the microprocessor 94 processes a predetermined one of the plurality of sets of instructions programmed in PROM 98 and issues data via microprocessor bus 96 to the programmable timer 102. In the example which will be used hereinbelow for describing the auto boresighting operation of the electro-optical system of FIG. 1, the light source 10, preferably a LED, is pulsed on for an appropriate time during a raster scan operation of one frame and left unpulsed during two successively generated frames subsequent the one frame. Therefore, the light beam spot image will appear in the generated electrical frame information of the one frame over the video signal line 54 and will have decayed sufficiently so as not to appear considerable in the succeeding two frames of electrical information generated subsequent the one frame.

Figure 2:
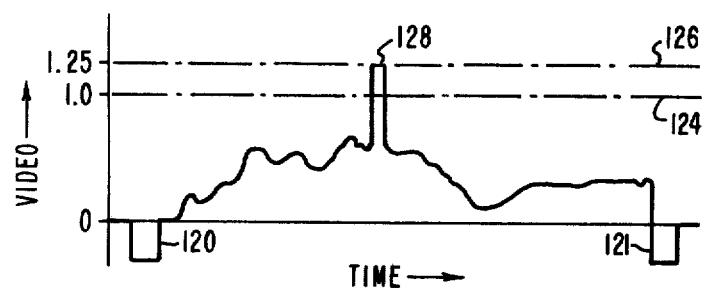
FIG. 2 is a graph depicting a line of raster scan electrical information, generated by the electro-optical sensor of FIG. 1 which exemplifies the relative intensities of the boresighted and light beam images.

Typically, a line of the video signal of one frame of electrical information may be graphically illustrated by the sketch of FIG. 2. In FIG. 2, between the sync pulses 120 and 121, there exist a graphical representation of the electrical signal amplitude representative of the image intensity in a selected line in the field of view of the electro-optical sensor 42 for one raster scan frame. In the present embodiment, the maximum level of image intensity expected from the boresighted image 24 may be normalized at 1.0 denoted by the dash line 124. A second dash line 126 may represent the maximum desired electrical signal level, such as 1.25, for example, for the light beam spot image as projected on the sensor plate. The illustrative time graph of FIG. 2 depicts the electrical information of a selected line of a generated frame during which the light source has been controlled to effect a light beam spot image on the photocathode 50 as denoted by the pulse 128 having an amplitude greater than the normalized level at 124. It is understood that when the light source 10 is not controlled to effect a light beam image on the photocathode plate 50, this pulse image 128 will be sufficiently decayed so as to be considered missing from the electrical information of a raster scan frame as generated by the raster scan mechanism 52 over the signal line 54.

Figure 3:
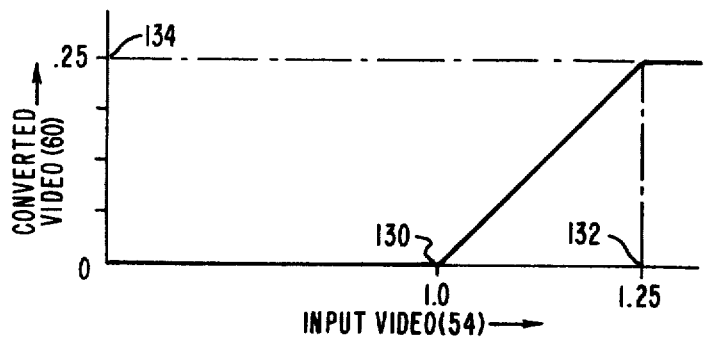
FIG. 3 is a graph characterizing the function of a video converter suitable for use in the embodiment of FIG. 1.

For purposes of the present embodiment, the field of view signal 54 is provided to a video converter 56 which may be comprised of an operational amplifier having an appropriately chosen feedback arrangement to operate in accordance with the characterization as shown in the graph of FIG. 3. The value of the bias signal 58 may be chosen commensurately with the normalized video signal value. The characterization of FIG. 3 suggests that the converted video signal may be clamped substantially at a zero electrical value until it should reach approximately the normalized value at point 130 wherein after it may be amplified by some predetermined gain, probably one, until the input video reaches its second plateau at 132, for example, wherein thereafter it may be clamped substantially at the desired maximum denoted at 134. In the graphs of FIGS. 2 and 3, the value 1.0 represents the normalized value of the electrical video signal and the value 1.25 represents the desired maximum normalized video signal. Therefore, the value of the converted normalized video signal, in the present embodiment, may be only permitted to range from 0 to 0.25 with respect to the video electrical signal levels generated over signal line 54.

The converted video signal 60 may be provided to the comparator 64 wherein it is digitized to one of a first and a second value with respect to its amplitude level. For example, if the reference 66 is set substantially close to the zero amplitude level, then that converted video signal which is greater than the zero amplitude level may become a one and that which is less than the reference signal may become a zero. Consequently, only the light beam spot image electrical signal representations will be designated as one and the remaining boresighted video image representations will be designated as zero over signal line 68. Of course, it is understood that the converse of this may also be true without deviating from applicant's invention.

As was described above, at least a portion of each generated frame or field of electrical information representative of the field of view of the electro-optical sensor 42 may be partitioned into an array of pixels. For the embodiment of FIG. 1, the partitioned portion may be comprised of a 16×16 array of pixels centrally located in the generated frame of electrical information such as that illustrated in FIG. 4. This pixel array is more commonly referred to as the autoboresight window. A frame reference position within the partitioned portion may be predetermined, preferably by the four pixels centrally located in the generated frame of electrical information and denoted in FIG. 4 as A, B, C and D. Still further, the remaining partitioned pixels of the predetermined portion may be divided into subarrays having geometric relationships to the centrally located frame reference position. In the present embodiment, the predetermined portion is divided into four equal quadrants denoted by UPL, UPR, LRL and LRR which are representative respectively of the upper lefthand portion, upper righthand portion, lower lefthand portion and lower righthand portion of the autoboresight window.

Now with the aid of the address counter 86, timing signals 84 and shift register 70, the digitized signals 68 may be further classified into 8 bit digital words corresponding to the digitized pixel information within a raster scan format. Each 8 bit word may be assigned an address location in the autoboresight word memory 72 utilizing the address counter 86 and address lines 88. One example of such an addressing classification is shown in more specific detail in the autoboresight window depiction of FIG. 5. In general, a raster scan field is generated by scanning each line in the field from left to right. Thus, referring to FIG. 1, the digitized pixel information at 68 is clocked into the shift register 70 starting at the upper lefthand corner of the autoboresight window. The first 8 bit word of pixel information of the raster scan field to be entered into the shift register 70 may be assigned a 0 address (see FIG. 5). Accordingly, the second 8 bit word may be assigned a 16 address and the remaining partitioned 8 bit words generated successively in designated autoboresight windows of the field of electrical information may be correspondingly assigned the addresses 1, 17, 2, 18, ..., 14, 30, 15, 31. Note that the frame reference pixels denoted by the capital letters A, B, C and D are located respectively in the formed 8 bit digital words 7, 23, 8, and 24. The centrally located pixels A and C are contained in the least significant bits of the addressed words 7 and 8, respectively. Likewise, the centrally located pixels B and D are located in the most significant bits of the formed words at addresses 23 and 24, respectively.

Since the example which is being used to describe the autoboresighting operation of the electro-optical system of FIG. 1 is one which permits a light beam spot image to appear on the photocathode 50 for one field and to not detectably appear for the two succeeding fields, the autoboresight window digitized information of at least three consecutive fields should be stored in the autoboresight word memory 72 in accordance with the 8 bit word classification format (FIG. 5) described supra. In the present embodiment, a portion, preferably the five least significant bits, of the classification address of the 8 bit words stored in memory 72 may be commonly assigned in accordance with their sequential formation in the raster scan format. In order to identify in which generated video field the 8 bit word has been formed and stored, the at least two most significant bits of the address classification may be assigned for those purposes.

Concurrently with the formation and storage of the 8 bit words of pixel information from the autoboresight windows, the converted video information at 60 corresponding to the four centrally located pixels A, B, C and D may be converted by the unit 62 at times governed by the address signal 92 to form multi-bit words, associated therewith, which may be stored in the autoboresight RAM 78 utilizing signal lines 76. For the purposes of the embodiment as shown in FIG. 1, the A/D 62 converts the converted video at 60 for the pixels A, B, C and D into four bit words which are stored in the RAM 78 for the appropriate three consecutive fields in accordance with the addressing signals 90.

After the converted video information has been selectively stored in the memories 72 and 78 for the appropriately chosen three consecutive fields, for example, the address counter 86 of FIG. 1 may provide an interrupt signal 140 to the microprocessor 94 to initiate the execution of a prespecified number of programmed sets of instructions from the PROM 98. The flowcharts of FIGS. 6 and 7 exemplify functionally the operations of the microprocessor system comprising the microprocessor 94, the PROM 98, the microprocessor bus 96, the scratchpad memory 100 and the D/A's 110 and 112, in combination. It is understood that with the benefit of the flowcharts of FIGS. 6 and 7 any programmer of ordinary skill in the art may preprogram the PROM 98 with instructions and data compatible with and interpretable by the microprocessor 94 for carrying out a sequence of desirable operations.

Figure 6:
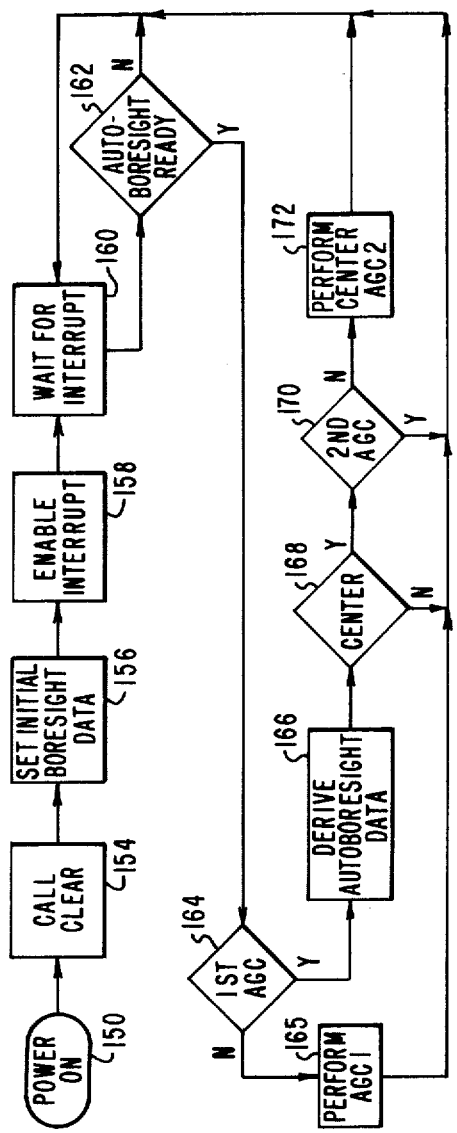
FIGS. 6 and 7 are operational flowcharts suitable for use in programming the PROM included in the embodiment of FIG. 1.

Referring to FIG. 6, block 150 refers to the power turn on of the electronic portion of the electro-optical system as shown in FIG. 1. Normally in conventional microprocessor systems, a reset signal such as that shown at 152 in FIG. 1 is supplied to the microprocessor 94 which renders a starting address in the program counter of the microprocessor 94 for program execution initiation. In the present example, a clear subroutine is next executed in accordance with block 154. This subroutine may be comprised of instructions for clearing the scratchpad memory registers at 100 and in addition the registers in the memories of 72 and 78, if required. In the next set of instructions at 156 initial boresight data is preset in the D/A's 110 and 112, for example, for initially biasing the raster scan mechanism 52 over signal lines 114 and 116, respectively. In addition, another digital data word may be provided to the programmable timer 102 via microprocessor bus 96 to initially determine the pulse width of the current pulse to the light emitting diode at point 10. Thereafter, the external interrupt response to line 40 of the microprocessor 94 is enabled by the instruction of block 158. The microprocessor system then sits in a wait for interrupt loop shown at 160 until an interrupt pulse arrives over signal line 140, for example.

Upon reception of the interrupt over line 140, a decisional block 162 is executed to determine if the proper amount of converted video information has been accumulated. For the present example, three consecutively generated fields should be stored in the memories 72 and 78. If not, program execution reverts to the wait for interrupt state at 160; otherwise, the next instructional block is executed. In the present embodiment, it is assumed that some automatic gain control for the initial intensity of the light beam spot image on the photocathode 50 may take place. Decisional block 164 determines whether this has initially occurred. If it hasn't, a sequence of instructions for performing a first automatic gain control (AGC) is performed in block 165.

It is understood that there exists many types of AGC algorithms which may be used for the purposes of controlling the beam spot intensity on the photocathode plate 50. One such type, which may be used in the present embodiment, controls the pulse width intensity of a light emitting diode at 10 in accordance with a successive approximation sequence to maintain the light beam spot image to within a desirable area of the photocathode plate. The pixel information digitized at 68 and stored into the autoboresight word memory 72, as described supra, may be utilized by the microprocessor 94 via microprocessor bus 96. More specifically a digital word may first be set into the programmable timer 102 which may have the capacity of 14 bits. The initial digital word representing pulse width may be one-half capacity or having a one in the most significant bit with the other bits all zeros. In the first AGC sequence as performed by the block 165, it may be determined if a spot image indeed is detected from the pixel information at 68 as stored in memory 72. If no detection is encountered, the digital word submitted to the programmable timer 102 is increased by one-half; otherwise, it is decreased by one-half. The sequence is repeated in a conventional fashion until all of the bits of the 14 word capacity of the timer 102 have been either set to a one or a zero. After this has been accomplished in block 165, it is assumed that the timer 102 has been gain adjusted to control the light emitting diode at 10 with a desirable pulse width to effect an appropriately chosen spot image on the photocathode plate 50 for the purposes of deriving autoboresight information.

Thereafter, when the decisional block 164 is next executed and yields an affirmative response, autoboresight data may be derived in accordance with the instructions executed at block 166. The derivation in 166, which will be described in greater detail herebelow, includes determining from the pixel information of the memories 72 and 78 a position of the sensed light beam spot image in the raster scan field of view of the photocathode plate 50 in accordance with the predetermined time pattern of image intensity variations of the light beam source as controlled by the microprocessor 94 through the programmable timer 102. Accordingly, once the spot image position is determined, a positional relationship thereof with respect to the predetermined frame reference position is next established. Preferably, the predetermined frame reference position is at the center of the generated frame information of the raster scan field of view of the electro-optical sensor 42. Thereafter, the vertical and horizontal biasing control signals 114 and 116 which are coupled to the raster scan mechanism 52 through the D/A's 110 and 112, respectively, may be derived in terms of the established positioned relationship. These vertical and horizontal signals 114 and 116, respectively, are utilized, in the present embodiment, for adjusting the raster scan field of view in the generated frames of electrical information as a function of the established positional relationship to converge the determined position of the sensed light beam spot image to the predetermined frame reference position whereby referencing the actual boresight image axis substantially to the predetermined frame reference position, preferably at the center of the raster scan, in the generated frames of electrical information.

After the instructions of 166 have been executed, it may next be determined if the light beam spot image is located at the predetermined frame reference position, preferably within one of the pixels denoted by A, B, C and D by the instructions of block 168. If not, program execution may revert to the wait for interrupt subroutine at 160; otherwise, it may next be determined at decisional block 170 if a second AGC has been conducted and if it has not, the instructions of block 172 may next be executed; otherwise, program execution is again reverted to the wait for interrupt subroutine at 160. With regard to the performance of the second AGC, it is understood by those skilled in the pertinent art that only in some instances will this be necessary. The necessity normally is a function of the type of electro-optical sensor and lens combinations being utilized for compensating the changing background lighting conditions in contrast to the boresighted image at 24. In the present embodiment, the four bit words representative of the converted video for the pixels A, B, C and D may be added together in block 172 and an average figure derived therefrom. Subsequently, the derived average figure may be compared to a predetermined number, like 45, for example, and the current pulse width to the light emitting diode at 10 via bus 96 and programmable timer 102 may be adjusted as a function of the comparison difference. After performing the second AGC, program execution may be continued at block 160.

Figure 4:
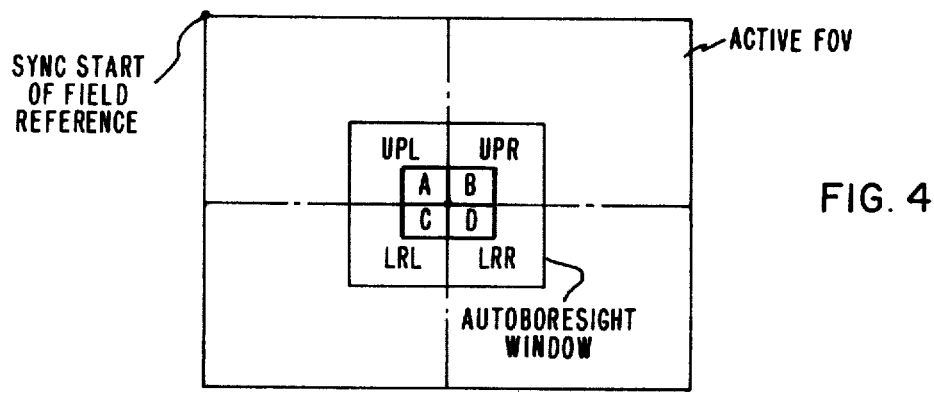
FIG. 4 is a sketch depicting the positioning of an autoboresight window array of pixels in a typical generated frame of electrical information.
Figure 5:
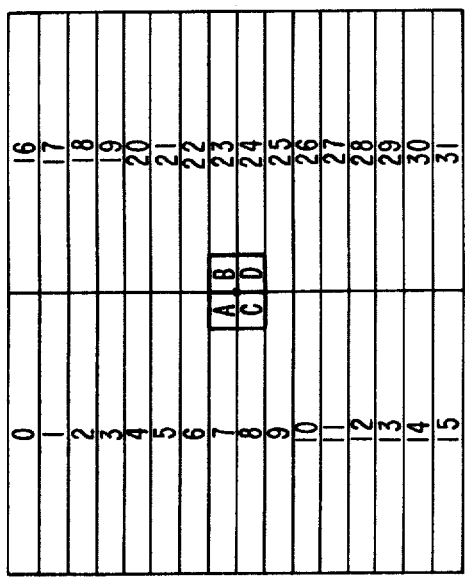
FIG. 5 is an illustration of a suitable partitioning and indexing of the autoboresight window array into 8-bit word subarrays of pixels for use in the embodiment of FIG. 1.

The program instruction execution with regard to the derivation of autoboresight data at block 166 may be described in more detail in connection with the flowchart of FIG. 7 and the illustrative depictions of the autoboresight window in FIGS. 4 and 5. Starting with FIG. 7, the subroutine of 166 may be entered at block 180 wherein a program variable LP is set equal to the integer 32 which, for the present embodiment, is representative of the 32 eight bit words which are commonly addressed between 0 to 31, for example, for each of the three consecutive fields. Next, in block 181, another program variable k is set equal to 32 minus LP such that when LP is equal to 32, k is equal to 0 and when LP is equal to 1, k is equal to 31. In the program execution, block 181 is merely used as an indexing expedient for program loop operations which will become more apparent from the description of the other instructional blocks 182, 183, 184, and 185 in the loop.

Figure 8:
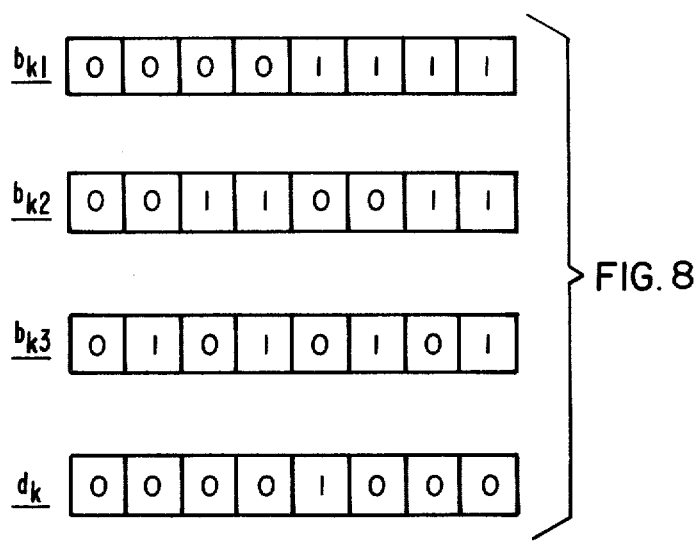
FIGS. 8 and 9 are illustrations of 8-bit word subarrays derived in the course of an exemplary operation of the embodiment of FIG. 1 in connection with the operational flowcharts of FIGS. 6 and 7.

In instructional block 182, a 8 bit word $d_k$ is formed from the logical "and"ing of the commonly addressed 8 bit words of each of the three consecutive fields stored in memory 72. For example, referring to FIG. 8, suppose that the information in each of the commonly addressed 8 bit words for fields 1, 2 and 3 denoted by the $b_{k1}$, $b_{k2}$, and $b_{k3}$, respectively, is as shown in FIG. 8. Since the "and"ing operation of the instruction block 182 requires that the digital words of $b_{k2}$ and $b_{k3}$ be inverted, the derived digital word $d_k$ of the example in FIG. 8 will incur a one in only the fourth least significant bit position. The primary reason for the particular logical "and"ing function is to produce a one in only those bits which reflect a light beam spot image intensity pattern being on for the first field of information and off for the succeeding two fields of information. It can be shown in FIG. 8 that the fourth least significant bit of the three commonly addressed 8 bit words is the only one that reflects this predetermined time pattern. Therefore, it is determined that the light beam spot image occurs at least in the $d_k$ word at the fourth least significant bit position.

For the example just described, a light beam spot image or portion thereof was detected in the 8 bit word $d_k$. However, in the majority of 8 bit digital words in the range of 0 to 31, the detection of a light beam spot image or portion thereof is not anticipated. In the succeeding decisional block 183, it is next determined if a light beam spot image has been detected in the bits of the digital word $d_k$, if none has been detected then the program variable LP is decremented by one in instructional block 184 and program execution is continued at instructional block 181. Thus each commonly assigned digital word $d_k$ of the three consecutive fields of information stored in memory 72 is investigated, in the present embodiment, starting at address k=0 and continuing consecutively upward to address k=31. If no light beam spot image is detected in the autoboresight window before the program variable LP reaches 0, then program execution at 166 (FIG. 6) will be exited when the program variable LP eventually reaches 0 as determined by decisional block 185.

Under normal conditions, after the first AGC has been performed by block 165 (FIG. 6), it is anticipated that at least one of the derived digital words $d_k$ will contain a one in one of its bits indicative that at least one of the pixel images represented thereby has the time pattern code of the light source 10. In this case, the decision of block 183 may be affirmative permitting program execution to continue at block 187 wherein another program variable R may be set equal to LP minus 17. The subsequently executed instructional blocks perform the function of establishing the position of the detected light beam spot image in the autoboresight window. The numerical value of LP in block 187 is, of course, representative of the commonly addressed 8 bit word k in the autoboresight window according to the format as shown in FIG. 5.

Figure 9:
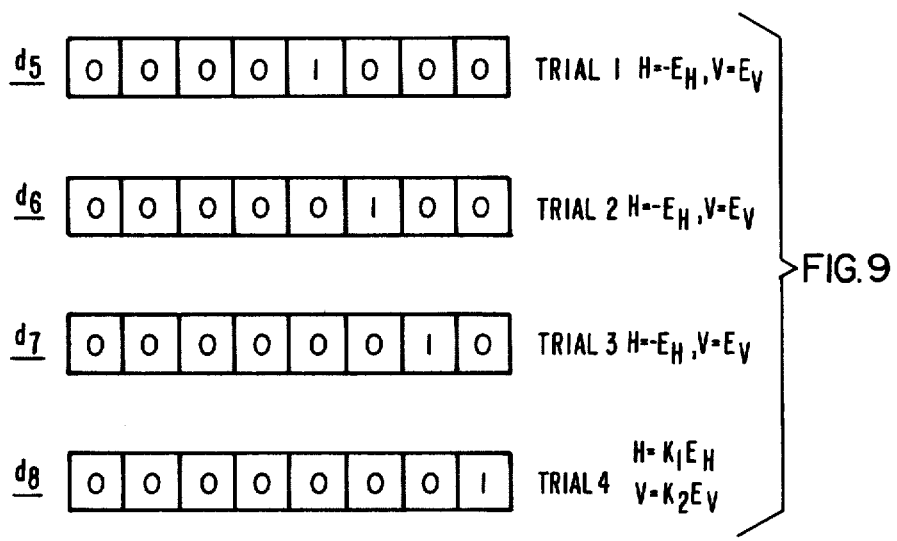

For the purposes of description convenience, assume that k equals 5 for a first trial and the derived word $d_5$ is as appears in FIG. 9. For k to equal 5, LP should be equal to 27. In the next executed decisional block 189, it is determined, utilizing the program variable R, if the light beam spot image has been detected in the lefthand side or righthand side of the autoboresight window. That is, if R is greater than or equal to 0 the light beam spot image may be detected in the lefthand side of the window; otherwise, if R is less than 0, the light beam spot image may be detected in the righthand side of the window. In the chosen example (LP equal to 27) as depicted in FIG. 9, R is greater than 0 resulting in the execution of instructional block 190 next. In the instructional blocks 190, 191, 192, 193 and 194, it is determined if the light beam spot image is detected in an 8 bit word in the upper lefthand quadrant or the lower lefthand quadrant. In the example of trial one, the light beam spot image portion detected in the commonly addressed word 5 is in the upper lefthand quadrant or UPL.

Thereafter, in the decisional block 195 it is determined if R is not equal to 0. The intent here is to determine if the light beam spot image portion is in one of the digital words enumerated as 7 or 8. For the trial one example (FIG. 9), it is not. Therefore, the signal values for the horizontal and vertical biasing signals H and V, respectively, may be computed in the following instructional block 196. These computations may be carried out in accordance with equations (1) and (2) found herebelow:

$$H = \begin{cases} E_H & S \in UPR \text{ or } S \in LRR \\ -E_H & S \in UPL \text{ or } S \in LRL \end{cases} \quad (1)$$

$$V = \begin{cases} E_V & S \in UPL \text{ or } S \in UPR \\ -E_V & S \in LRL \text{ or } S \in LRR \end{cases} \quad (2)$$

The resulting values of H and V may then be output through the appropriate D/A's by the instructions of block 198. Thereafter, the program may be exited at 200.

In the present embodiment, the values chosen for $E_H$ and $E_V$ for both the horizontal and vertical raster scan biasing values are such to move or adjust the raster scan field of view in the generated frames of electrical information in a quantized manner either left or right one picture element (pixel). The sign associated with the value $E_H$ and $E_V$ designates direction. For example, with regard to horizontal movement, no sign may be indicative of a one pixel element movement of the raster scan field of view in the generated frames of electrical information to the right and a minus sign may be indicative of a one pixel element movement to the left. And likewise, with regard to vertical movement, no sign may be indicative of one picture element adjustment of the raster scan field of view in the generated frames of electrical information downward and a negative sign may be indicative of one picture element movement upward. Therefore in accordance with the example trial 1 as shown in FIG. 9, the derived values of H and V may be $-E_H$ and $E_V$, respectively. These values for H and V are intended to adjust the raster scan field of view in the generated frames of electrical information to the right and down, one pixel element each.

Subsequently, in the second example trial (FIG. 9), the light beam spot image may be detected in the commonly addressed word enumerated at 6 and at the third least significant bit therein as determined by the execution of the instructions 180 through 200 of FIG. 7. Likewise, in the third trial, the light beam spot image may be detected in the digital word enumerated at 7 at the second least most significant bit therein. In the execution of the instructions of the flowchart in FIG. 7, this may be detected at block 195 causing the block 196 to be executed next wherein the derived word $d_k$ or $d_7$, for the present example, may be "and"ed with a digital word having only a one in its least significant bit ($01_{16}$). It is next determined if the resulting digital word, denoted as S, is equal to 0 and if so, as in the case of trial three, the program execution may be continued at block 196 where the signal values of H and V may be computed in accordance with equations (1) and (2) above as $-E_H$ and $E_V$, respectively. These values may be output to their appropriate D/A's in 198 and the program may again be exited at 200.

In the next trial, the beam spot image may be detected in the least significant bit of the commonly assigned word enumerated at 8. In this trial, the resulting word S from the execution of block 196 will not be equal to 0. Therefore, decisional block 197 branches the program execution of the flowchart to another computational block denoted by 202 in FIG. 7. In the computational block 202, the raster scan biasing values H and V may be computed in accordance with the equations (3) and (4) found directly herebelow:

$$H = \left[ \frac{B + D - (A + C)}{A + B + C + D} \right] \cdot E_H \quad (3)$$

$$V = \left[ \frac{A + B - (C + D)}{A + B + C + D} \right] \cdot E_V \quad (4)$$

The values for the pixels denoted as A, B, C and D may be the 4 bit digital words converted by the A/D 62 and stored in the autoboresight RAM 78. The digital words A, B, C and D may be accessed and retrieved from the memory 78 as needed in accordance with the instructions of block 202. Preferably, the most recently converted values of A, B, C and D are applied to the equations (3) and (4) shown hereabove. After execution of block 202, the newly calculated values for H and V may again be output to their appropriate D/A's by the instructions of block 198 and the depicted subroutine may be exited at 200.

Should the detected light beam spot image be shifted to the righthand side of the autoboresight window of the electro-optical sensor 42, the program execution of the flowchart of 166 will branch at the decisional block 189 to instructional block 204. The combination of instructional blocks 204, 206, 208, 210 and 212 determine in which quadrant LRR or UPR, the light beam spot image is detected. In the following decisional block 214, it may be determined if the light beam spot image falls in one of the enumerated digital words 23 or 24. If not, program execution continues at the computational block 196 where the biasing values H and V are computed in accordance with equations (1) and (2) and thereafter output accordingly at 198. However, if the spot image is found to be in either of the digital words 23 or 24, it may next be determined by instructional block 216 if the spot image is detected in the most significant bit thereof or more specifically in the pixel bits denoted in FIG. 5 at B and D. This is accomplished in instructional block 216 by "and"ing the derived digital word $d_k$ with a digital word having only a one in its most significant bit. The resulting word, denoted as S, may be compared with a zero value in the decisional block 218. If it is determined that S=0, program execution may be branched to the computational block 196, however, if S is not equal to 0, computational block 202 is next executed. In either case the computed values of H and V may be output to their appropriate D/A's according to the instructions of 198 and the program may be exited at 200.

Figure 7:
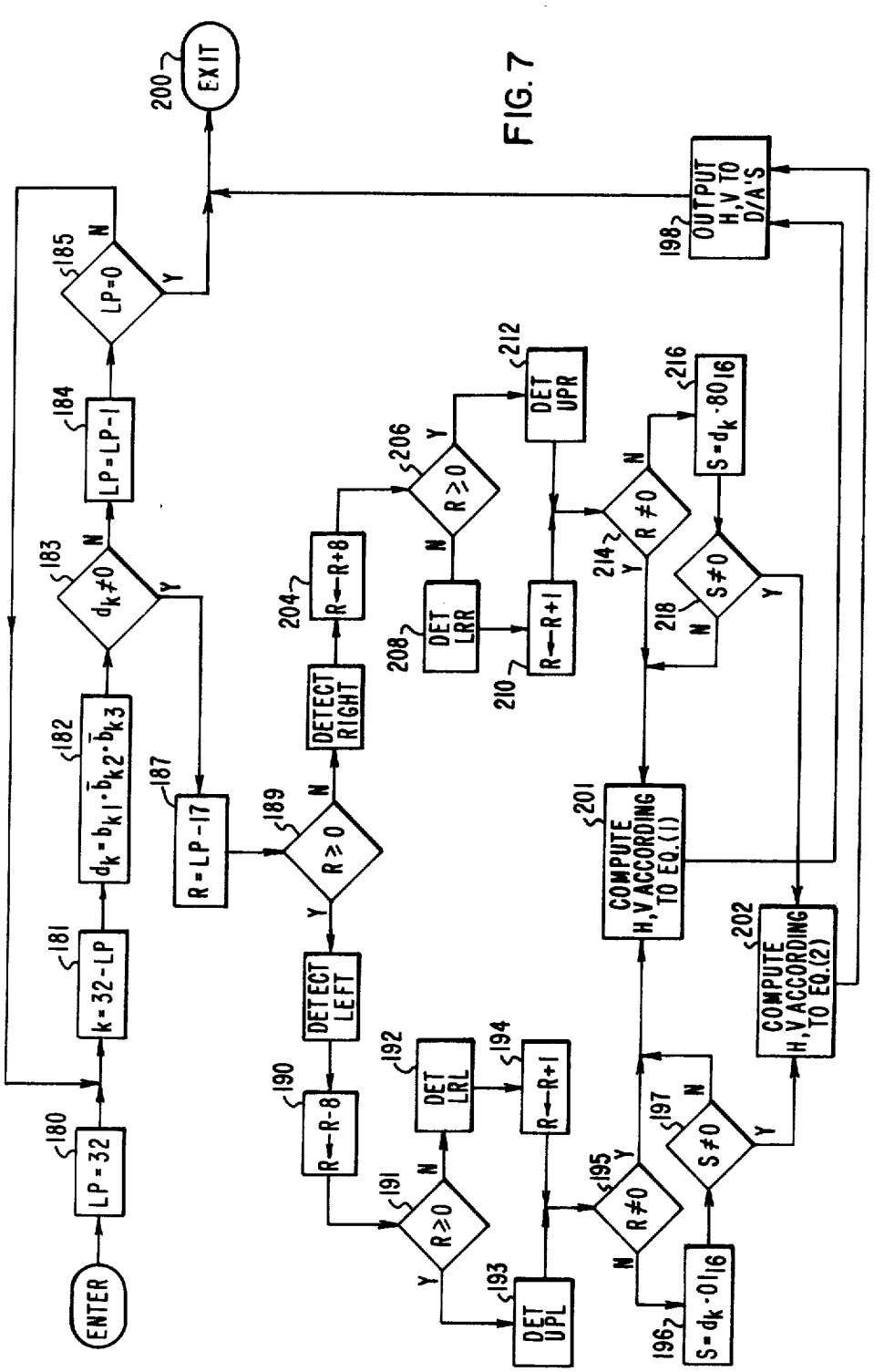

The above operational description, in connection with the flowcharts of FIGS. 6 and 7, provide the knowledge to enable anyone skilled in the pertinent art to make and use applicant's inventive principles as directed to an electro-optical system similar to the one described in connection with the embodiment of FIG. 1. However, it should be understood that the simple time pattern code of the light beam being turned on to effect a detectable spot image in one generated video frame and turned off so as to not effect a detectable spot image in the two succeeding video frames was merely used to facilitate a description of operation of applicant's inventive principles. In a more practical sense, the predetermined time pattern for controlling the light source 10 would more than likely have a greater number of intensity variations as sensed by the electro-optical sensor 42. Dependent on the application of the electro-optical sensor, a time pattern having a more frequent turn on pattern versus turn off and/or one of a psuedo-random nature may have a greater effect of minimizing false alarms due to generated noise and of decreasing the susceptibility of adversary jamming. With this in mind, it is further understood that applicant's invention should not be limited to any one particular embodiment, but rather construed more broadly by the breadth and scope of the recitation of the claims hereto follow.

I claim:

1. In an electro-optical system including a light source for emitting a beam of light with a reference axis; a boresighted image having a boresight axis; an electro-optical sensor for sensing images within a field of view thereof; a combination of optical elements aligned for rendering said boresight image axis substantially colinear with said light beam reference axis and for guiding said combined light beam and boresighted images with colinear axes spatially fixed concurrently to the field of view of said electro-optical sensor, said electro-optical sensor being operative to generate sequentially frames of electrical information in a raster scan format, said electrical information of each frame being representative of the combination of light beam and boresighted images in a field of view of said sensor, an improvement comprising:

means for controlling said light source to effect a coded time pattern of light beam image intensity variations as sensed by said electro-optical sensor over a predetermined number of sequentially generated frames thereof;

means for discriminating at least a portion of said sensed light beam image from said sensed boresighted image in the electrical information of said predetermined number of sequentially generated frames based on said coded time pattern of said sensed light beam image;

means for determining a position of said discriminated portion of said sensed light beam image in the raster scanned field of view of said electro-optical sensor;

means for establishing a positional relationship of said determined position with respect to a predetermined frame reference position in the generated frame information of said raster scanned field of view of said electro-optical sensor; and means for adjusting the raster scanned field of view in said generated frames of electrical information as a function of said established positional relationship to converge said determined position to said predetermined frame reference position, thereby referencing the boresight image axis substantially to said predetermined frame reference position in the generated frames of electrical information.

2. The improvement of claim 1 wherein the controlling means controls the light source to effect a coded time pattern of light beam image intensities in the electro-optical sensor which renders electrical value representations thereof above a predetermined threshold value in a corresponding coded pattern for the predetermined number of sequentially generated frames of electrical information by the electro-optical sensor.

3. The improvement of claim 2 wherein the discriminating means includes:

means for partitioning at least a portion of the electrical information of a generated frame into an indexed array of picture elements, each having an electrical value representation of the image intensities;

means for assigning a first value to the picture elements of said array which have an electrical value greater than the predetermined threshold value and for assigning a second value to the remaining picture elements of said array; and means for identifying at least one commonly indexed, array picture element of a predetermined number of successively generated frames which renders a pattern of assigned first and second values corresponding to the coded light beam image pattern, whereby said at least one identified picture element is determined as belonging to the light beam image; and wherein the position determining means includes:

means for determining an indexed relationship of the at least one identified picture element with respect to a predetermined frame reference index; and wherein said determined indexed relationship governs the adjusting means to converge said identified picture element index to said predetermined frame reference index.

4. The improvement of claim 3 wherein the identifying means includes:
   means for grouping the assigned values of the picture elements of the partitioned array of the generated frames into indexed subarrays;
   means for collecting the indexed subarrays of the predetermined number of successively generated frames, said subarrays being commonly indexed for each of said successively generated frames; and
   means for identifying at least one commonly indexed subarray of the predetermined number of successively generated frames which includes at least one picture element having a sequentially varying assigned value pattern corresponding to the coded light beam image pattern; and wherein the means for determining the indexed relationship includes:
   means for dividing the partitioned array of picture elements of the generated frames into a number of sections about the predetermined frame reference index, each divided section including a number of indexed subarrays;
   means for determining the divided section of the partitioned frame array in which said identified indexed subarray is included; and
   means for deriving a positional direction with respect to the predetermined frame reference index based on said determined section, said derived positional direction being used to govern the adjusting means.

5. The improvement in accordance with claim 4 including:
   means for determining that the identified picture element index corresponds to the index of one of a group of picture elements which constitute the predetermined frame reference index;
   means for measuring the electrical value portion which is greater than the predetermined threshold value of the picture elements in said group constituting the predetermined frame reference;
   means for deriving another positional relationship based on a function of said measured electrical values of said group of picture elements; and
   means for governing the adjusting means in accordance with said derived another positional relationship, at times, when it is determined that the identified picture element index corresponds to the index of at least one of said group of picture elements.

6. The improvement in accordance with claim 5 wherein the partitioned picture element array is a square matrix of picture elements; wherein the predetermined frame reference index is at the center of the raster scan format; wherein the divided sections include the equal area quadrants of said square matrix; and wherein the group of picture elements include the four picture elements surrounding said matrix center.

7. In an electro-optical system including a light source for emitting a beam of light with a reference axis; a boresighted image having a boresight axis; and electro-optical sensor for sensing images within a field of view thereof; a combination of optical elements aligned for rendering said boresight image axis substantially colinear with said light beam reference axis and for guiding said combined light beam and boresighted images with colinear axes spatially fixed concurrently to the field of view of said electro-optical sensor, said electro-optical sensor being operative to generate sequentially frames of electrical information in a raster scan format, said electrical information of each frame being representative of the combination of light beam and boresighted images in a field of view of said sensor, an improvement comprising:
   means for controlling said light source to effect a coded time pattern of light beam image intensity variations as sensed by said electro-optical sensor over a predetermined number of sequentially generated frames thereof;
   means for partitioning the electrical information of a generated frame into a first portion representative of an inner area of the raster scanned field of view of said sensor and a second portion representative of an outer area, surrounding said inner area, of the raster scanned field of view of said sensor;
   means for discriminating at least a portion of said sensed light beam image from said sensed boresighted image in the electrical information of said predetermined number of sequentially generated frames based on said coded time pattern of said sensed light beam image;
   means for determining a position of said discriminated portion of said sensed light beam image in said raster scanned field of view of said sensor;
   first means for establishing from the generated frames of electrical information that said determined position is in said outer area;
   second means for establishing from the generated frames of electrical information that said determined position is in said inner area;
   means, governed by said first and second means, for deriving at least one control signal; and
   means, governed by said at least one control signal, for adjusting the raster scanned field of view in said generated frames of electrical information to converge said determined position to a predetermined frame reference position in the generated frames of electrical information.

8. The improvement in accordance with claim 7 wherein the deriving means includes:
   a third means, governed by said first means, for deriving the at least one control signal as a function based on a positional relationship of said determined position of at least a portion of the sensed light beam image with respect to the predetermined frame reference position in the generated frames of electrical information; and
   a fourth means, governed by said second means, for deriving the at least one control signal as a function based on the electrical information representative of the image intensity of at least a portion of the partioned inner area of the raster scanned field of view.

9. The improvement in accordance with claim 8 wherein the partitioning means divides the first and second portions of the electrical information of a generated frame into first and second arrays of picture elements, respectively, said picture elements being indexed with respect to the predetermined frame reference position; and wherein at least four picture elements surround the predetermined frame reference position and constitute substantially the second portion, inner area, of electrical information.

10. The improvement in accordance with claim 9 wherein the second means establishes that at least a portion of the determined position of the sensed light beam image is coincidental with at least one of the partitioned picture elements constituting the inner area of electrical information; wherein the fourth means is operative to generate electrical signals corresponding to the at least four picture elements of the inner area, denoted by A, B, C and D, said generated electrical signals being representative of the light beam image intensity of the corresponding picture elements of the inner area; and wherein the fourth means is further operative to derive horizontal and vertical adjustment control signals, H and V, in accordance with a function based on the generated electrical signal values of A, B, C and D.

* * * * *